Figure 1:
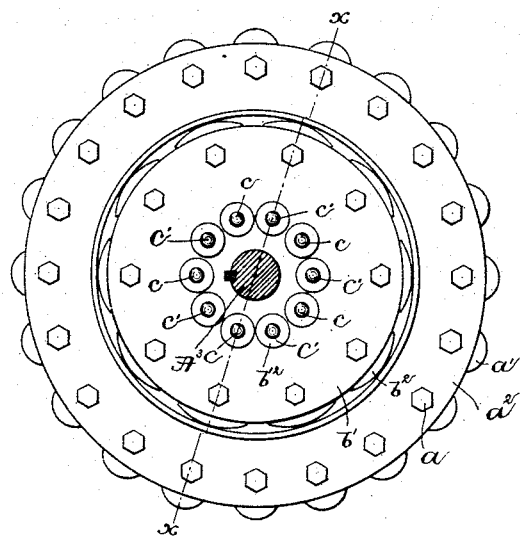

(No Model.)  2 Sheets—Sheet 1.

C. C. PECK.
ELECTRIC MOTOR.

No. 411,833.  Patented Oct. 1, 1889.

Witnesses.
Howard F. Eaton.
Frederick L. Emery.

Inventor.
Charles C. Peck,
by Crosby & Gregory
Attys.

(No Model.) 2 Sheets—Sheet 2.
C. C. PECK.
ELECTRIC MOTOR.
No. 411,833. Patented Oct. 1, 1889.
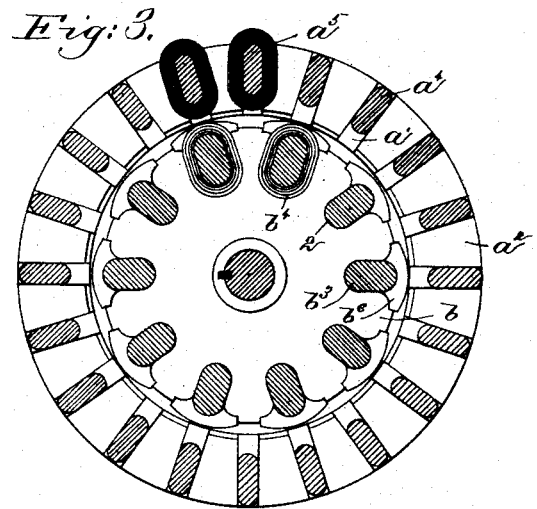
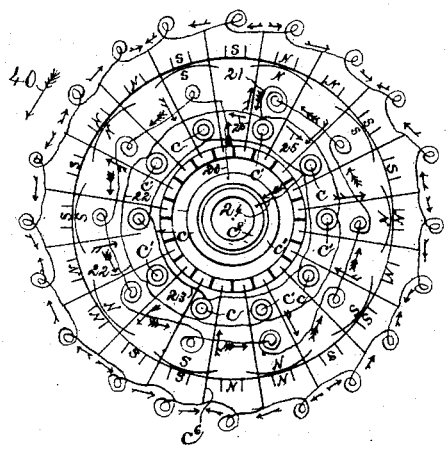
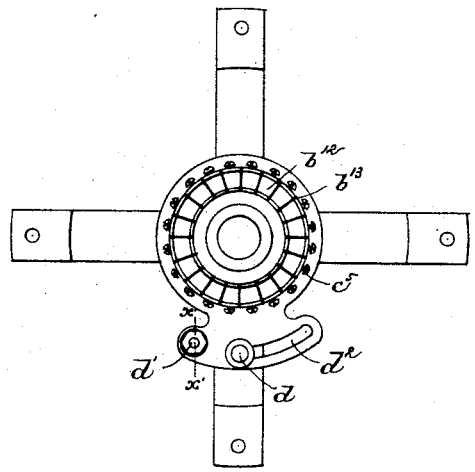
Witnesses
Howard F. Eaton.
Frederick L. Emery.
Inventor.
Charles C. Peck,
By Crosby & Gregory
Attys

UNITED STATES PATENT OFFICE.

CHARLES C. PECK, OF MIDDLEBURY, VERMONT, ASSIGNOR TO THE GIANT ELECTRIC MOTOR COMPANY, OF KITTERY, MAINE.

ELECTRIC MOTOR.

SPECIFICATION forming part of Letters Patent No. 411,833, dated October 1, 1889.

Application filed September 25, 1888. Serial No. 286,319. (No model.)

*To all whom it may concern:*

Be it known that I, CHARLES C. PECK, of Middlebury, county of Addison, State of Vermont, have invented an Improvement in Electric Motors, of which the following description, in connection with the accompanying drawings, is a specification, like letters on the drawings representing like parts.

This invention relates to electric motors, and has for its object to provide a novel and efficient motor of increased capacity and power, my improved motor being especially adapted to be used on railway-cars or in other places where heavy work is to be done.

Electric motors as now commonly constructed and known to me, when used for heavy work requiring a slow motion—such, for instance, as on cars employed on electric street-railways—are not mounted directly upon the car axle or shaft to be driven; but the shaft of the said motor is coupled or connected with the said axle or shaft to be driven by intermediate gearing to obtain the desired or necessary leverage or power.

My invention has for its object to construct an electric motor, as will be described, whereby the torsional effort of the motor on its shaft is increased to such extent that the said motor may be applied directly to the shaft to be driven—that is, the motor-shaft forms a part of the shaft to be driven, the said motor being capable of being constructed to revolve at any desired speed.

In accordance with my invention the increased torsional effort of the motor is obtained by having both the field and armature composed or made up of a number of independent magnets, the outer periphery of each armature-magnet being made eccentric to the inner periphery of the field-magnets, whereby a uniform movement of approach of the surface of one magnet toward the surface of the other is obtained to gain or effect a uniform or steady force tending to revolve the shaft and thereby obtain the maximum power.

My invention in an electric machine or motor consists, essentially, in a series of fixed electro-magnets and a second series of electro-magnets movable about an axis parallel to its own magnetic axis, and having its surface adjacent to the fixed electro-magnets made eccentric to the axis of revolution, but more nearly concentric with its own magnetic mass, one series of magnets being wound, substantially as described, to produce reversals of polarity in each of its magnets, as each magnet of the other series is revolved by each magnet of the first series of magnets, substantially as will be described.

Other features of my invention will be pointed out in the claims at the end of this specification.

Figure 2:
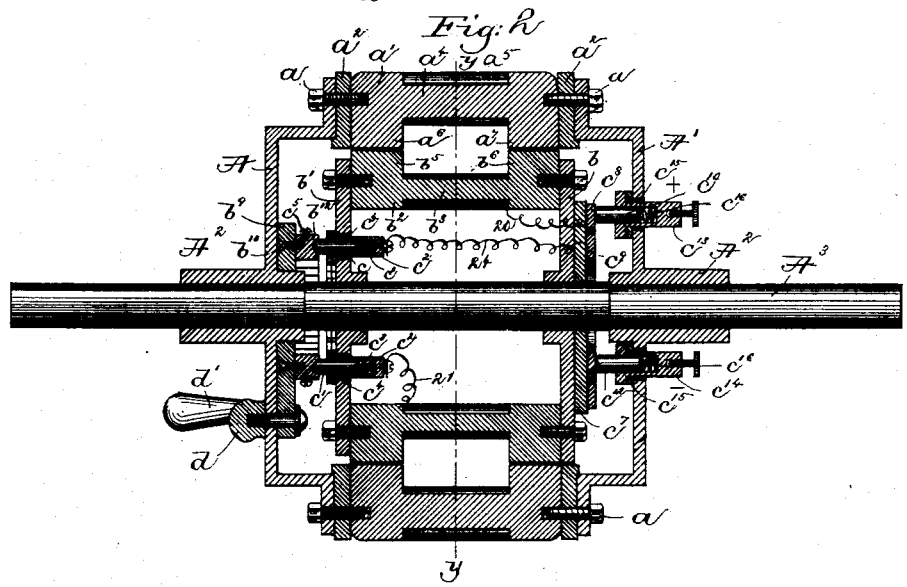

Figure 1 is an end elevation of a motor embodying my invention, looking to the right in Fig. 2, the outer bearing for the shaft and the commutator attached thereto being removed. Fig. 2 is a longitudinal section of the motor shown in Fig. 1 on line $x\,x$. Fig. 3 is a cross-section of the motor shown in Fig. 2 on line $y\,y$ to more clearly show the construction of the cores, the coils of wire being shown on but two cores; Fig. 4, a detail to more clearly show the commutator and reversing switch or mechanism by which the direction of rotation of the motor-shaft is changed; Fig. 5, a sectional detail on line $x'\,x'$, Fig. 4; and Fig. 6 is a diagram showing the manner of connecting the wires of the armature and field magnets and the course and distribution of the electric current.

The frames or supports $A\,A'$ are provided, as shown, with hubs $A^2$, which form bearings for the shaft $A^3$ of the motor.

The frames $A\,A'$ have secured to their outer ends, as by bolts $a$, magnetic cores $a'$, separated from the frames $A\,A'$ by check-pieces $a^2$, preferably of brass. The cores $a$, as shown in Fig. 2, are reduced or cut away at the center to form a shank, as $a^4$, about which the wire $a^5$ is wound, as shown in Fig. 3, the ends of each core forming pole-pieces, as $a^6\,a^7$, (see Fig. 2,) which, when the cores are placed in position and secured to the frames $A\,A'$, form two parallel circularly-peripheral surfaces extending around the motor and having the motor-shaft $A$ as a common center. The shaft $A^3$, within the frames $A\,A'$, has keyed or otherwise secured on it two disks $b\,b'$, preferably of brass. The disks $b\,b'$, at or near their periphery, have secured to them magnetic cores $b^2$, provided with a shank, as $b^3$, about which the wire $b^4$ is wound, (see Fig. 3,) the said core having enlarged ends to form pole-pieces $b^5 b^6$ to co-operate with the pole-pieces $a^6 a^7$, as shown in Fig. 2. The outer surface of each pole-piece $b^5 b^6$ is made eccentric to the pole-pieces of the magnets $a^5$, as clearly shown in Fig. 3, the outer surface of each pole-piece being shown in the arc of a circle having a center, as at 2, (see Fig. 3,) between the inner surface of the pole-pieces of the magnets $a^5$ and the shaft A.

The hub $A^2$, on the inner side of the frame A, has loosely mounted on it, as herein shown, a disk $b^9$, of fiber or other insulating material, having a commutator composed of a series of segments $b^{12}$, (see Fig. 4,) preferably of brass, the said segments being arranged in a circle and separated by plates or disks $b^{13}$, of mica or other suitable insulation, interposed between adjacent segments, the said segments being herein shown secured to the disk $b^9$ by screws $b^{10}$. The segments $b^{12}$ of the commutator are equal in number to the number of the field-magnets $a'$. The segments $b^{12}$ are provided upon their inner faces, as herein shown, with a semicircular groove, (see Fig. 2,) into which is extended, preferably, the spherically-shaped end of contact-pins $c\ c'$, each of which pins is fitted into a socket $c^2$, containing, as shown, a spiral spring $c^3$, which acts against the end of the contact-pin to keep it in engagement with the commutator-segment, the said socket, preferably made of metal, being herein shown insulated from the disk $b$ by a cushion $c^4$, of insulating material. The semi-spherically-shaped groove imparts to the contact-pins a slight movement on their own axes and causes the surface to be worn evenly. Each segment of the commutator is provided with a screw $c^5$, by which one end of the wire $c^6$ (represented in Fig. 6) is connected to the wire $a^5$ of the magnets $a'$. The disk $b$ has secured to it on its outer face, as herein shown, a disk $c^7$, of insulating material, to which are secured two metallic rings $c^8\ c^9$, having co-operating with them contact-pins $c^{10}\ c^{12}$, located in sockets $c^{13}\ c^{14}$, insulated, as herein shown, by a cushion $c^{15}$ from the frame $A'$, the said contact-pins being kept in engagement with the said rings by spiral springs $c^{16}$. The sockets $c^{13}\ c^{14}$ constitute, respectively, the two terminals of the motor to which the positive and the negative wires are connected, the positive wire being connected, as herein shown, to the socket $c^{13}$, and the negative to the socket $c^{14}$.

The field-magnets $a'$ and the armature-magnets $b^2$ are wound alike, but are connected differently, as will be described. Beginning at the inner end the wire of each magnet is laid or wound on its core in a left-hand direction as viewed in the diagram Fig. 6, the ends of the wires of the different magnets being connected, so that in the field-magnets the outside end of the first magnet is connected to the inside end of the second field-magnet, and the outside end of the second field-magnet to the inside end of the third field-magnet, and so on until the connections have been completed to form a continuous wire around the field-magnet, as shown in Fig. 6.

The wires of the armature-magnets are connected as follows: The outside end of the wire of the first magnet is connected to the outside end of the wire of the second magnet, and the inside end of the wire of the second magnet with the inside end of the wire of the third magnet, and the outside end of the wire of the third magnet with the outside end of the wire of the fourth magnet, and so on until the last magnet is reached, when the outside end of the wire of the last magnet is connected to the outside ring $c^8$.

Referring to Fig. 6, it will be noticed that the ring $c^8$ is connected by wire 20 (see Figs. 2 and 6) to the last magnet, and the first magnet is connected, as by wire 21, to the socket of one contact-pin $c'$, and the said contact-pin is connected to the other contact-pins $c'$ by wires 22, and, as indicated in Fig. 6, the remaining contact-pins $c$ are connected together by wires 23, and by wire 24 to the contact-ring $c^9$.

Referring to Fig. 6, it will be noticed that the magnets are wound to produce two consecutive north poles alternating with two consecutive south poles, and in practice by the movement of the permanent north and south magnets of the armature past the north and south poles of the field-magnets the polarity of the latter magnets is changed once for each magnet of the armature during every revolution of the said armature.

As shown in Fig. 6, the north poles of the armature are opposite a north pole of the field-magnet and next to a south pole of the field-magnet.

Let it be supposed that the armature is revolving in the direction of arrow 40, and as each north pole approaches a south pole it is attracted by the latter and repelled by the north pole of the field-magnet which it is just leaving, and the south pole of the armature, which is now opposite a south pole of the field-magnet, will be repelled by the south pole of the field-magnet and attracted by the next succeeding north pole of the field-magnet. The lines of force emanating from the field-magnets are strongest at the center of the pole-pieces of the said magnets and exert their greatest attractive force upon that portion of the pole-pieces of the armature-cores directly under the pole-pieces of the field-magnets. Owing to the eccentricity of the outer periphery of the armature-core pole-pieces, the lines of force reaching from the pole-pieces of the field-magnets gradually increase in length from the center of the pole-piece of the armature toward the ends or sides of the said armature pole-pieces. The lines of force which reach from the center of the pole-pieces of the field-magnets to the ends or sides of the pole-pieces of the armature-cores have a less attractive force than those reaching directly to the center of the pole-pieces of the armature-cores; but as the armature is revolved the long lines of force gradually grow shorter as the eccentric sides or ends of the armature pole-pieces approach the center of the pole-pieces of the field-magnets. As the lines of force gradually grow shorter, the attraction of the eccentric end or side of the armature pole-pieces is gradually increased—that is, the pull of the field-magnet pole-pieces upon the eccentric pole-pieces of the armature is gradually increased—and as a result of this construction the torsional effort tending to revolve the shaft is slower and steadier, thereby obtaining the maximum power of the magnet.

The course of the current may be traced through the motor as follows: The current is led by the contact-pin $c^{10}$ to the outside ring $c^8$, thence by wire 20 to the armature-coils, the whole current passing through each succeeding coil of the armature in turn until it reaches the last armature-coil, from whence it passes by wire 21 to one of the contact-pins $c'$. (See Figs. 2 and 6.) The current is now divided equally between five of the contact-pins $c'$, as indicated by arrows 25, Fig. 6, and from each contact-pin $c'$ two-tenths of the whole current passes by the commutator-segment in contact with the pin $c'$ and wire $c^6$, connected with the said commutator-segment, to the field-magnets, where it is divided, as clearly shown in Fig. 6, and one-tenth of the outer current, as herein shown, passes through each coil of the field-magnets, it returning again by wires $c^6$ to the commutator-segments in contact with the pins $c$, the current then passing by wire 24 to the inner ring $c^9$, from whence it is taken by the pin $c^{12}$, connected to the negative wire of the supply-circuit. The disk $b^9$ is provided with a slot through which is extended a stud-screw $d$, (see Fig. 4,) the said disk being provided with a handle $d'$. (See Figs. 2 and 5.) The slot $d^2$ is made of sufficient length to permit the disk to be turned sufficiently to bring the commutator-segments in contact with different contact-pins—that is, the commutator-segments now in contact with the pins $c'$ will be brought in contact with the pins $c$, so that when the current is turned on and passes, as above described, through the armature the polarity of the field-magnets will be changed or reversed from what is shown in Fig. 6.

It is evident that the size of the machines may be varied at will, the ratio between the contact-pins, the armature-magnets, and the field-magnets being preserved.

In practice each field-magnet, in order that it may be charged to the same magnetic potential as each armature-magnet, will be provided, as herein shown, with ten times as many convolutions of wire as the armature-magnets, which wire would be of much smaller diameter than the wire employed on the armature-magnets.

It will be noticed that the axis or center of the magnetic mass or core of each armature-magnet is parallel with the axis of revolution and with the inner peripheral surface of the field-magnets; but the surface of the armature-core or magnetic mass is eccentric to the axis of revolution and the said peripheral surface.

I have herein shown the inner circle of magnets (designated by me as the "armature") as revolving, and the outer circle as stationary; but in some cases it may be desired to have the outer circle of magnets revolve and the inner circle stationary, in which case the shaft will be rigidly supported.

The motor above described may be constructed to run at any desired speed by changing the size of the magnets and the diameter of the circle in which they are placed—as, for instance, if a high speed is desired large magnets placed in a smaller circle are employed, and for low speed small magnets in a large circle.

I claim—

1. In an electric machine or motor, a series of fixed electro-magnets and a second series of electro-magnets movable about an axis parallel to its own magnetic axis, and having its surface adjacent to the fixed electro-magnet made eccentric to the axis of revolution but more nearly concentric with its own magnetic mass, one series of magnets being wound, substantially as described, to produce reversals of polarity in each of its magnets as each magnet of the other series is revolved by each magnet of the first series of magnets, substantially as described.

2. In an electric machine or motor, a series of magnets having two sets of pole-pieces forming peripheral surfaces concentric with the axis of revolution, and a second set of magnets arranged to revolve on the axis of revolution, and having the surfaces of its pole-pieces adjacent to the first set of magnets eccentric to the said peripheral surfaces, combined with a commutator consisting of contact-pieces $b^{12}$, connected to said magnets and provided with a groove, and pins, as $c\ c'$, having spherically-shaped ends fitted into said groove, and means, substantially as described, to maintain said pins in electrical connection with the said contact-pieces, substantially as set forth.

3. In an electric motor, the combination, with the frame A, the shaft $A^3$, disks $b\ b'$, mounted thereon, and magnets $a'$, attached to said frame, of magnets $b^2$, having the outer periphery of their pole-pieces eccentric to the inner periphery of the poles of the magnets $a'$, and supports A A′ for the magnets $b^2$, substantially as described.

4. In an electric machine or motor, a series of magnets having two sets of pole-pieces forming peripheral surfaces concentric with the axis of revolution, combined with a second set of magnets arranged within the first set of magnets to revolve on the axis of revolution, and having the surfaces of its pole-pieces adjacent to the outer set of magnets eccentric to the said peripheral surfaces, the outer set of magnets being wound, substantially as described, to produce reversals of polarity in each of the said outer magnets as each inner magnet is revolved by each of the said outer magnets, substantially as described.

5. In an electric machine or motor, a series of magnets having two sets of pole-pieces forming peripheral surfaces concentric with the axis of revolution, a second set of magnets arranged within the first set of magnets to revolve on the axis of revolution, and having the surfaces of its pole-pieces adjacent to the outer set of magnets eccentric to the said peripheral surfaces, the outer set of magnets being wound, substantially as described, to produce reversals of polarity in each of the said outer magnets as each inner magnet is revolved by each of the said outer magnets, combined with the commutator consisting of contact-pieces $b^{12}$ and pins $c\ c'$, co-operating therewith, substantially as described.

In testimony whereof I have signed my name to this specification in the presence of two subscribing witnesses.

CHARLES C. PECK.

Witnesses:
WILLIS G. SCOTT,
CHARLES E. PINNEY.